(12) United States Patent
Ka (10) Patent No.: US 7,542,732 B2
(45) Date of Patent: Jun. 2, 2009

(54) DUSTPROOF AND PLUGGABE TRANSCEIVER

(75) Inventor: Ming-Zong Ka, Panchiao (TW)

(73) Assignee: Axcen Photonics Corp., Taipei Hsien (TW)

(*) Notice: Subject to any disclaimer, the term of this patent is extended or adjusted under 35 U.S.C. 154(b) by 498 days.

(21) Appl. No.: 11/303,907

(22) Filed: Dec. 19, 2005

(65) Prior Publication Data

US 2007/0066248 A1   Mar. 22, 2007

(30) Foreign Application Priority Data

Jun. 29, 2005   (TW) .............................. 94121960 A
Nov. 18, 2005   (TW) .............................. 94140664 A (51) Int. Cl.
*H04B 1/38* (2006.01)

(52) U.S. Cl. .......................... 455/90.3; 385/53; 385/55; 385/58; 385/70; 385/77; 385/92; 385/139

(58) Field of Classification Search ............... 455/90.3; 385/53, 55, 58, 70, 77, 92, 139
See application file for complete search history.

(56) References Cited

U.S. PATENT DOCUMENTS

| | | | |
|---|---|---|---|
| 6,247,849 B1* | 6/2001 | Liu | 385/55 |
| 6,702,477 B1* | 3/2004 | Ngo | 385/55 |
| 6,744,963 B2* | 6/2004 | Hwang | 385/139 |
| 6,863,445 B2* | 3/2005 | Ngo | 385/55 |
| 6,916,196 B2* | 7/2005 | Long et al. | 439/352 |
| 7,077,686 B2* | 7/2006 | Seo et al. | 439/372 |
| 7,201,520 B2* | 4/2007 | Mizue et al. | 385/92 |
| 7,287,916 B2* | 10/2007 | Mizue | 385/92 |
| 7,306,381 B2* | 12/2007 | Yu et al. | 385/92 |
| 7,307,847 B2* | 12/2007 | Torres et al. | 361/730 |
| 7,322,753 B2* | 1/2008 | Mizue et al. | 385/92 |
| 7,340,146 B2* | 3/2008 | Lampert et al. | 385/139 |

* cited by examiner

*Primary Examiner*—Matthew D Anderson
*Assistant Examiner*—April S Guzman
(74) *Attorney, Agent, or Firm*—Muncy, Geissler, Olds & Lowe, PLLC (57) ABSTRACT

A dustproof and pluggable transceiver includes a transceiver body, a first cover and a first rebounding member. The transceiver body on which the first cover is pivoted has a first opening, and the first rebounding member has a first end coupled with the transceiver body and a second end coupled with the first cover for providing a rebounding force to return the first cover to shelter the first opening so that dust-proofing is achieved. Through a driving member which is coupled with a direction-changing mechanism and pivoted on the first cover, and a pushing block coupled with the direction-changing mechanism, removal of the transceiver is controlled by the first cover.

15 Claims, 10 Drawing Sheets

DUSTPROOF AND PLUGGABE TRANSCEIVER

RELATED APPLICATIONS

The present application is based on, and claims priorities from, Taiwan Application Serial Number 94121960, filed Jun. 29, 2005; and Taiwan Application Serial Number 94140664, filed Nov. 18, 2005, the disclosure of which is hereby incorporated by reference herein in its entirety.

BACKGROUND

1. Field of Invention

The present invention relates to a transceiver. More particularly, the present invention relates to a dustproof transceiver.

2. Description of Related Art

As network technology grows rapidly, optoelectronic communication technology becomes more popular because of its capability of transferring a large amount of data at a high speed. The optoelectronics industry is involved with applications of integrating electronics and optics. One of critical components in optoelectronic communication is the optical transceiver module, which includes a receiver for transforming a received optical signal into an electronic signal, and a transmitter for transforming an electronic signal into an optical signal and transmitting it.

A networking product such as a hub is typically equipped with a transceiver as described above. Contaminants such as dust tend to accumulate in a transceiver or its associated devices, so the transceiver can be easily contaminated and damaged if proper protection is not provided after optical fiber is disconnected therefrom. A conventional way of protection is employing a plug to close off the opening of the transceiver after disconnection of the optical fiber.

Nevertheless, protection by manual plugging after disconnection of optical fiber often causes an inconvenience when information management staff or users operate or maintain the device, resulting in users forgetting or refusing to insert the plug or users losing the plug.

For the foregoing reasons, there is a need for an improved transceiver to avoid the problem above.

SUMMARY

It is therefore an objective of the present invention to provide a dustproof transceiver for preventing contamination.

It is another objective of the present invention to provide a dustproof transceiver for automatic dust protection.

It is another objective of the present invention to provide a dustproof transceiver whose dust cover is also capable of removing the transceiver from a stack.

In accordance with the foregoing and other objectives of the present invention, a dustproof transceiver is provided. A dustproof transceiver includes a transceiver body, a first cover and a first rebounding member. The transceiver body on which the first cover is pivoted has a first opening. The first rebounding member has a first end coupled with and against the transceiver body, and a second end is coupled with the first cover for exerting a force on and returning the first cover back to shelter a first opening of the transceiver body.

According to a preferred embodiment of the present invention, the transceiver body includes a steel shell and a base. The transceiver further includes a direction-changing mechanism and a pushing block, and the transceiver body further includes a driving member moving thereon. The direction-changing mechanism such as a reversing mechanism is coupled with the driving member and the pushing block. The first cover is pivoted with respect to the driving member, and the pushing block is restricted to move along a direction and has a pushing incline.

When the first cover is pulled along a first direction, the driving member moves along with the first cover and drives the pushing block to move along an opposite direction through a reversing mechanism to exclude obstruction by an obstructive member; therefore the transceiver can be removed from a stack without prior removal of an optical fiber connector.

In conclusion, the dustproof transceiver prevents components of the transceiver and the optical fiber connector from being damaged by contamination, enabling high product longevity and high reliability. Further, the dust-proofing function is automatically engaged as soon as the optical fiber connector is being removed from the transceiver. Moreover, the present invention provides a removal function of the transceiver such that it can be removed without removing the optical fiber connector, which is convenient to use and reduces the number of times which the optic fiber needs to be plugged and unplugged, and consequently, the optic fiber is less likely to be contaminated or wear down connectors of the device.

It is to be understood that both the foregoing general description and the following detailed description are by examples and are intended to provide further explanation of the invention as claimed.

BRIEF DESCRIPTION OF THE DRAWINGS

These and other features, aspects and advantages of the present invention will become better understood with regard to the following description, appended claims and accompanying drawings where:

DESCRIPTION OF THE PREFERRED EMBODIMENTS

The present invention discloses a transceiver integrated with a dust cover, which provides not only a great dustproof effect but also convenience and safety of storing the cover. Reference will now be made in detail to the present preferred embodiments of the invention, examples of which are illustrated in the accompanying drawings. Wherever possible, the same reference numbers are used in the drawings and the description to refer to the same or like parts.

Figure 1:
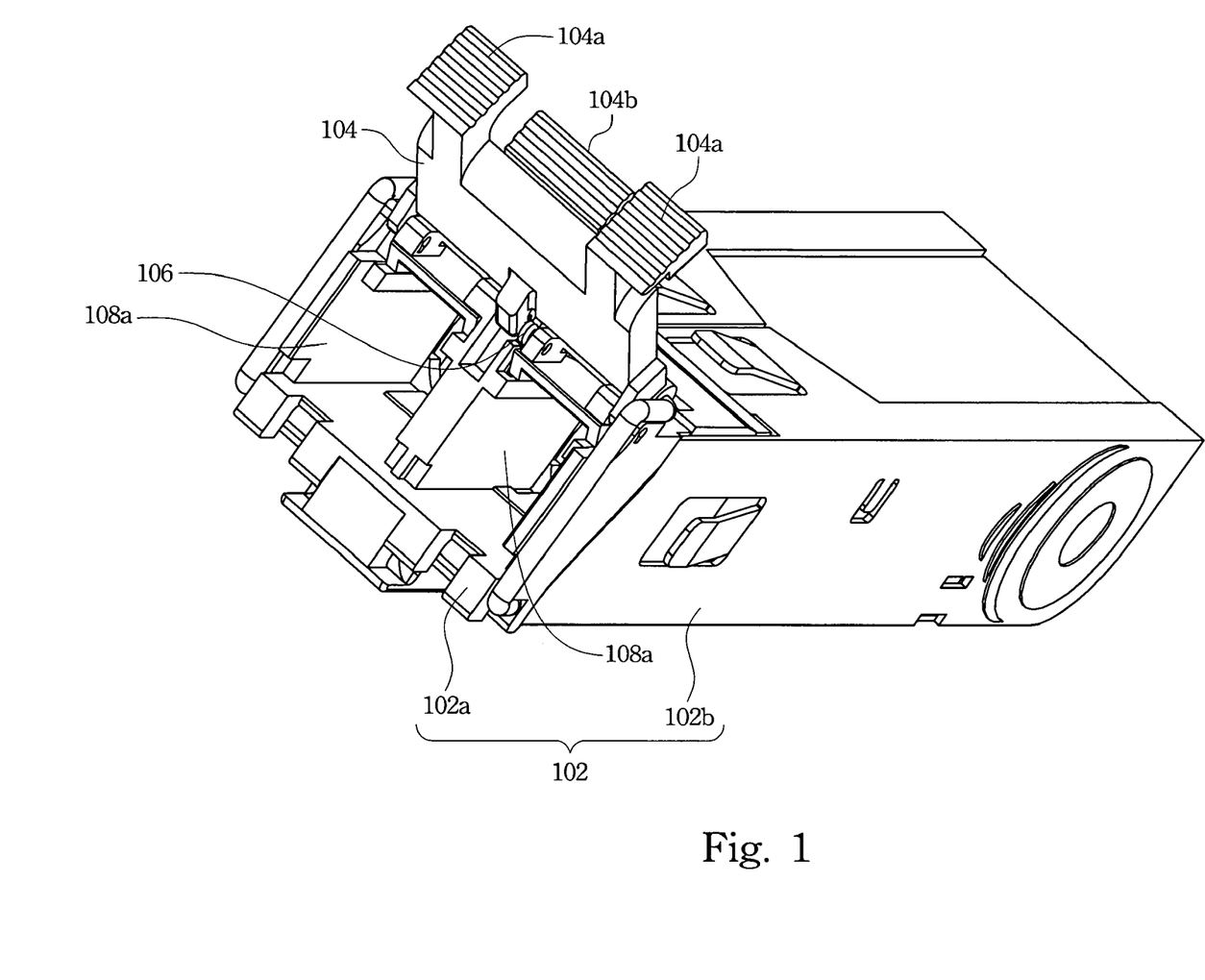
FIG. 1 is a schematic diagram of a transceiver in accordance with a preferred embodiment of the present invention.
Figure 2:
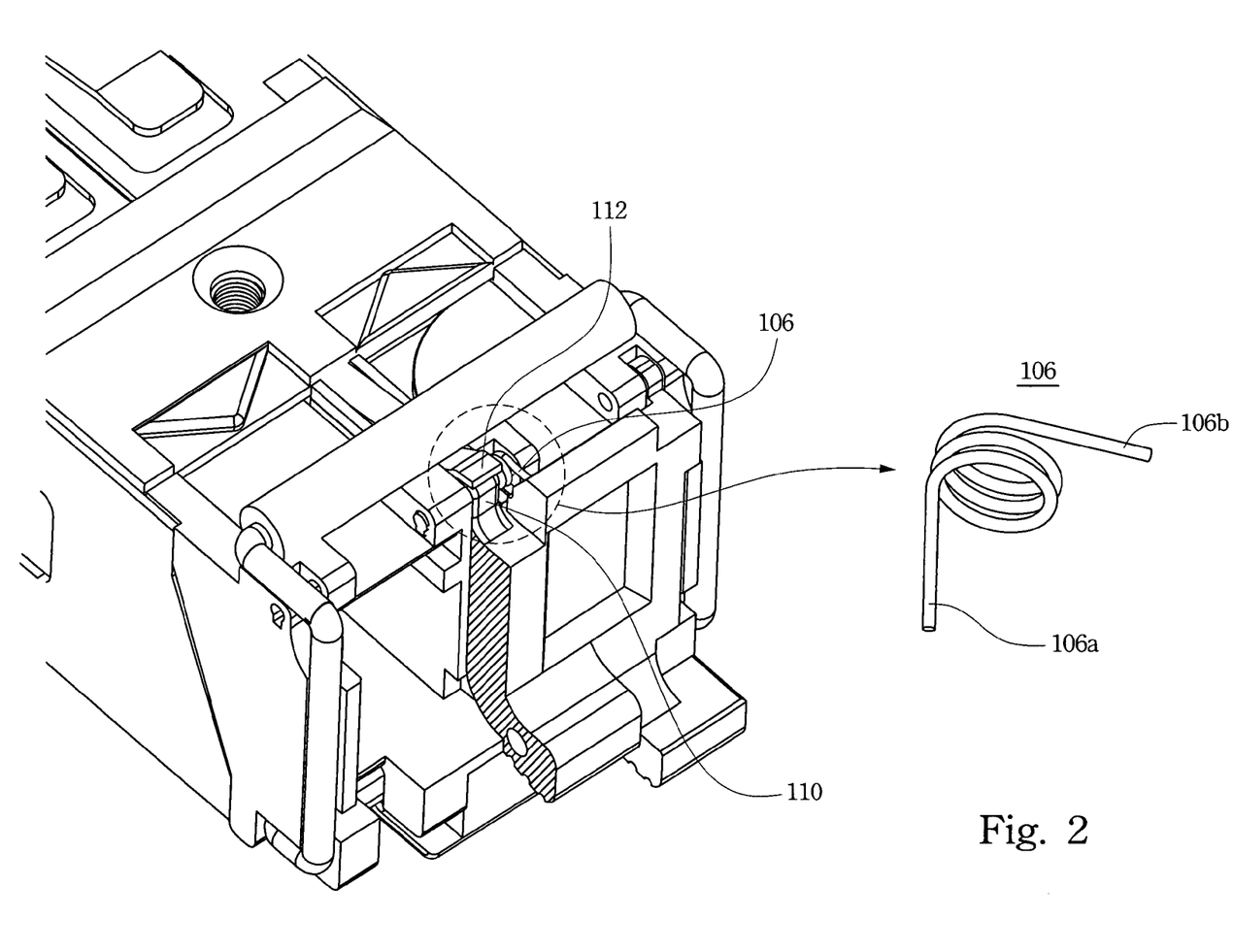
FIG. 2 is a schematic diagram of a flat spring in accordance with a preferred embodiment of the present invention.

FIG. 1 is a schematic diagram of a transceiver in accordance with a preferred embodiment of the present invention. FIG. 2 is a schematic diagram of a flat spring in accordance with a preferred embodiment of the present invention. For clear description of the embodiment, emphasis is made on an employment of a flat spring along with a first rebounding member, and only a portion of a first cover is shown.

Referring to FIG. 1 and FIG. 2, a dustproof transceiver includes a transceiver body 102, a first cover 104 and a first rebounding member 106. The transceiver body 102 has a first opening 108a, and the first cover 104 is pivoted on transceiver body 102. The first rebounding member 106 has a first end 106a coupled with the transceiver body 102 and a second end 106b for pressing against and returning the first cover 104 back to shelter a first opening 108a of the transceiver body 102.

In a preferred embodiment, the transceiver body 102 includes a base 102a, and an steel shell 102b which encloses the base 102a.

A first protrusion 104a protruding from the outer surface of the first cover 104 is adapted for the first cover 104 to be lifted more easily. Preferably, the first cover 104 further includes a second protrusion 104b separated from the first cover 104 at a predetermined distance so that the first cover 104 can be lifted more conveniently by users with larger fingers.

A torsion spring is employed as the first rebounding member 106, and a flat spring 112 fixed on the transceiver body 102 is also used to hold the first cover 104 when the first cover 104 is lifted up to a predefined angle A (not shown in the figure). The flat spring 112 exerts a force on a held part 110 of the first cover 104 to resist the first rebounding member 106 when the first cover 104 is lifted over a predefined angle A, so that the first cover 104 is held.

When the first cover 104 is lifted within the predefined angle A, the held part 110 is free from the force exerted by the flat spring 112, and the first cover automatically rotates to return back to the first opening 108a due to the action done by the first rebounding member 106. The predefined angle A depends on the geometry of the first cover 104 and the held part 110.

Figure 3:
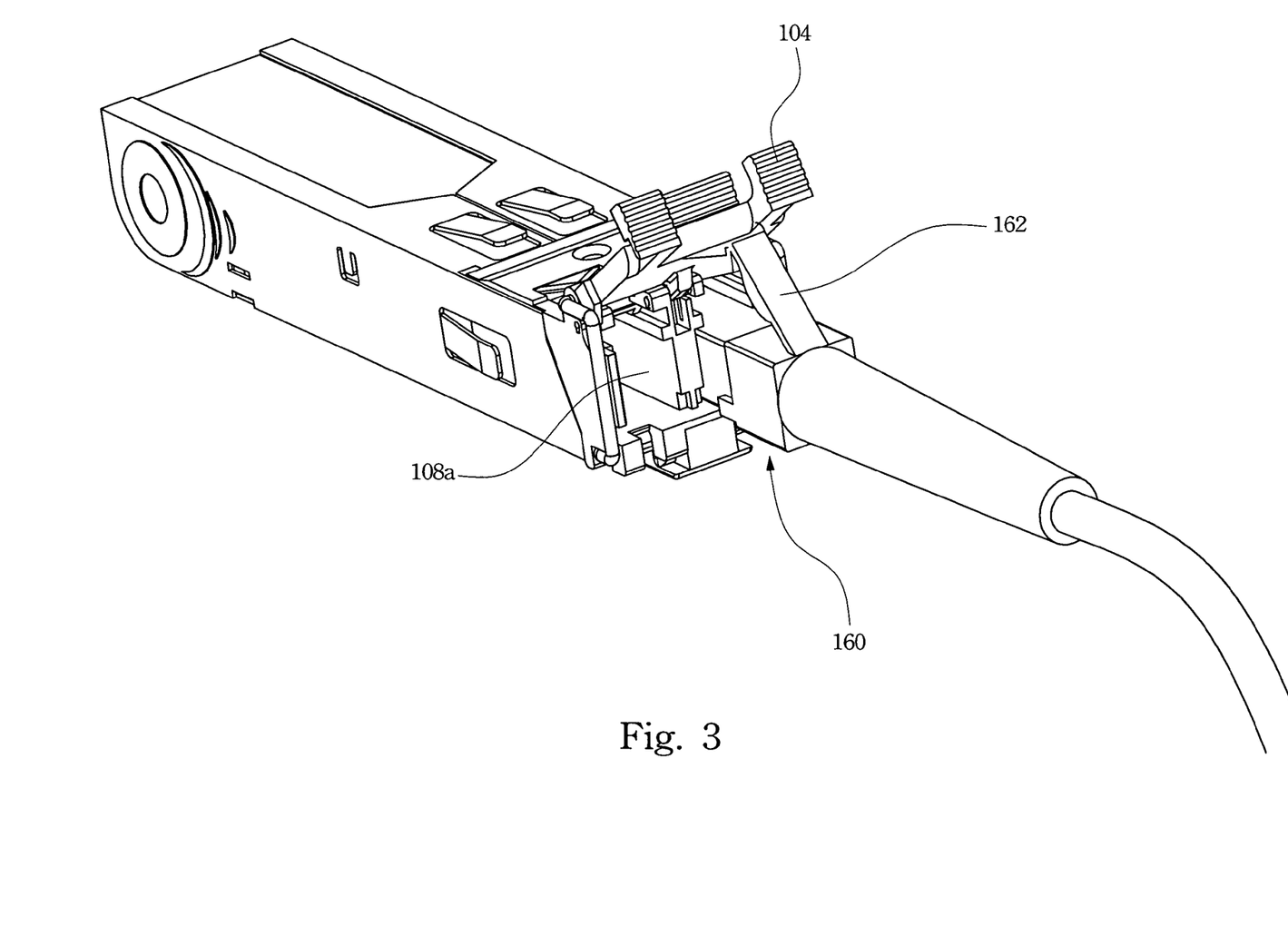
FIG. 3 is a schematic diagram of an optical fiber connecting to the transceiver in accordance with a preferred embodiment of the present invention.

Reference is also made to FIG. 3, which illustrates a schematic diagram of an optical fiber connecting to the transceiver in accordance with a preferred embodiment of the present invention. Before an optical fiber connector 160 is plugged into the transceiver, the first cover 104 is rotated away from the first opening 108a, and until the first cover 104 is lifted beyond the angle A, the flat spring 112 exerts a force on the held part 110 of the first cover 104, so that the first cover 104 is held instead of returning back to the first opening 108a and then the optical fiber connector 160 can be plugged into the first opening 108a.

Before the optical fiber connector 160 is removed from the transceiver, a removal part 162 is pressed and then the first cover is pressed consequentially so that not only the optical fiber connector 160 leaves the first opening 108a but also the first cover 104 returns back to shelter the first opening 108a in that the flat spring 112 no longer holds the first cover 104. Thus, an automatic dustproof function is provided.

Figure 4A:
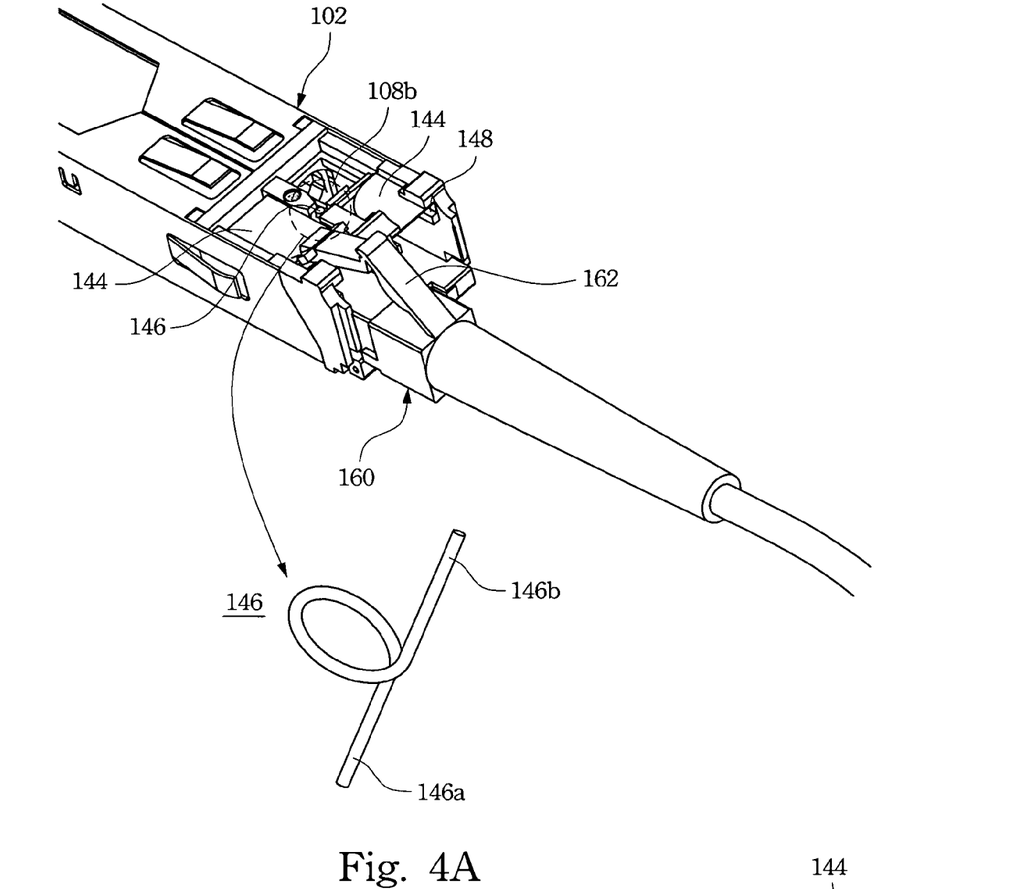
FIG. 4A is a schematic diagram of a second cover in accordance with a preferred embodiment of the present invention.
Figure 4B:
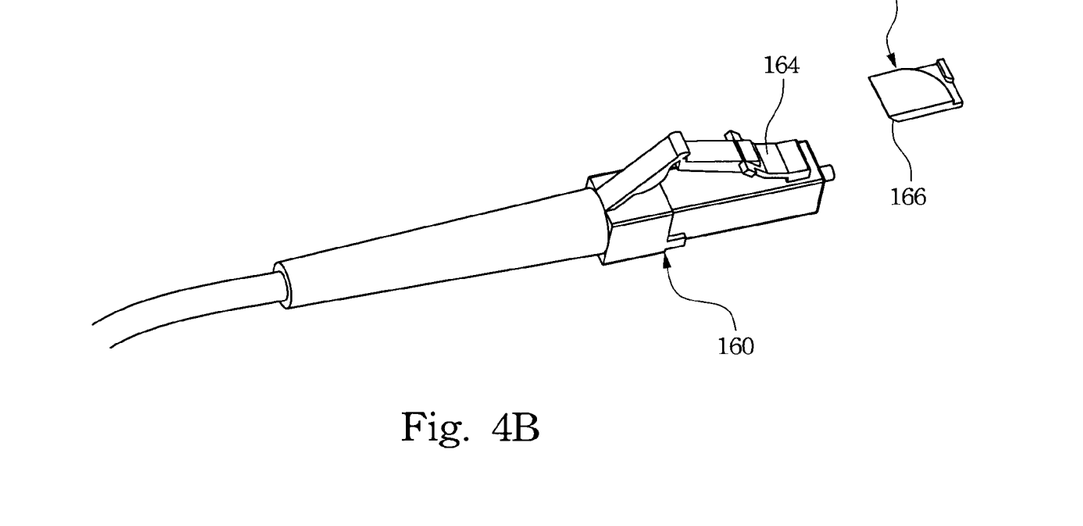
FIG. 4B is a schematic diagram of an optical fiber connector incline and a second cover incline of FIG. 4A.

FIG. 4A is a schematic diagram of a second cover in accordance with a preferred embodiment of the present invention. It should be noted that for clearer illustration of configuration of components, the first cover is omitted. FIG. 4B is a schematic diagram of an optical fiber connector incline and a second cover incline of FIG. 4A.

In the embodiment, the transceiver further includes a second cover 144 and a second rebounding member 146. The second cover 144 slides restrictedly in a bottom sliding slot 148 of the transceiver body 102, and the second rebounding member 146 is coupled with both the second cover 144 and the transceiver body 102 to allow the second cover 144 to shelter the second opening 108b of the transceiver body 102.

Two second covers are employed and a torsion spring is used as the second rebounding member 146 in the embodiment. The second rebounding member 146 is disposed on the transceiver body 102 and has a first resilient end 146a and a second resilient end 146b. There are two second resilient ends corresponding to the second covers respectively. The second resilient ends press against the second covers so that the covers are restrained in the bottom sliding slot 148 for sheltering a second opening 108b of the transceiver body 102. Herein, the plane of the second opening 108b is perpendicular to the plane of the first opening 108a.

The optical fiber connector 160 includes a connector incline 164 for resisting the second rebounding member 146 and pushing the second cover 144 away when the optical fiber connector 160 is plugged into the first opening 108a of the transceiver. On the other hand, the second rebounding member 146 pushes the second cover 144 back to shelter the second opening 108b for lack of resistance from the connector incline 164 when the optical fiber connector 160 is removed from the first opening 108a, and therefore a dustproof function is achieved.

Preferably, the second cover 144 further includes a second cover incline 166 for contacting with the connector incline 164, and the normal direction of the second cover incline 166 is parallel to that of the connector incline 164 so that the connector incline 164 pushes the second cover 144 more smoothly and directly.

Figure 4C:
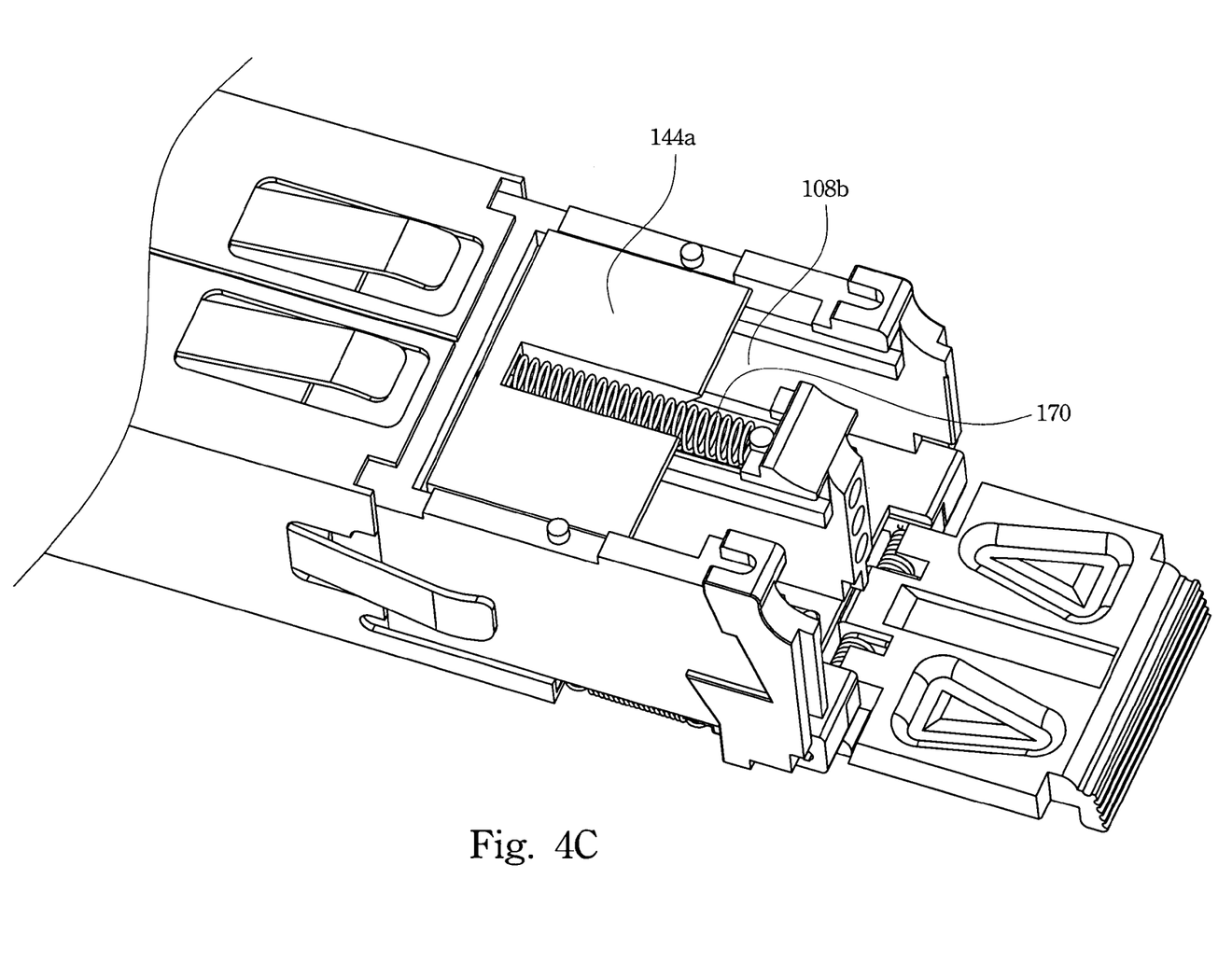
FIG. 4C is a schematic diagram of another aspect of the rebounding member of FIG. 4A.

FIG. 4C is a schematic diagram of another aspect of the rebounding member of FIG. 4A. According to the embodiment in FIG. 4A, the second rebounding member may be a tensile spring 170 alternatively. In such case, the tensile spring 170 is connected to the transceiver body and the second cover 144a with both ends respectively for providing a returning force for the second cover 144a.

The figure shows that the second cover 144a is pushed to move by the optical fiber connector where the optical fiber connector is omitted for showing the second opening 108b. When the optical fiber connector is removed, the second cover 144a is pulled back by the tensile spring 170 and is kept to cover the second opening 108b. Therefore an automatic dust proof is available when the transceiver is not used.

Figure 5A:
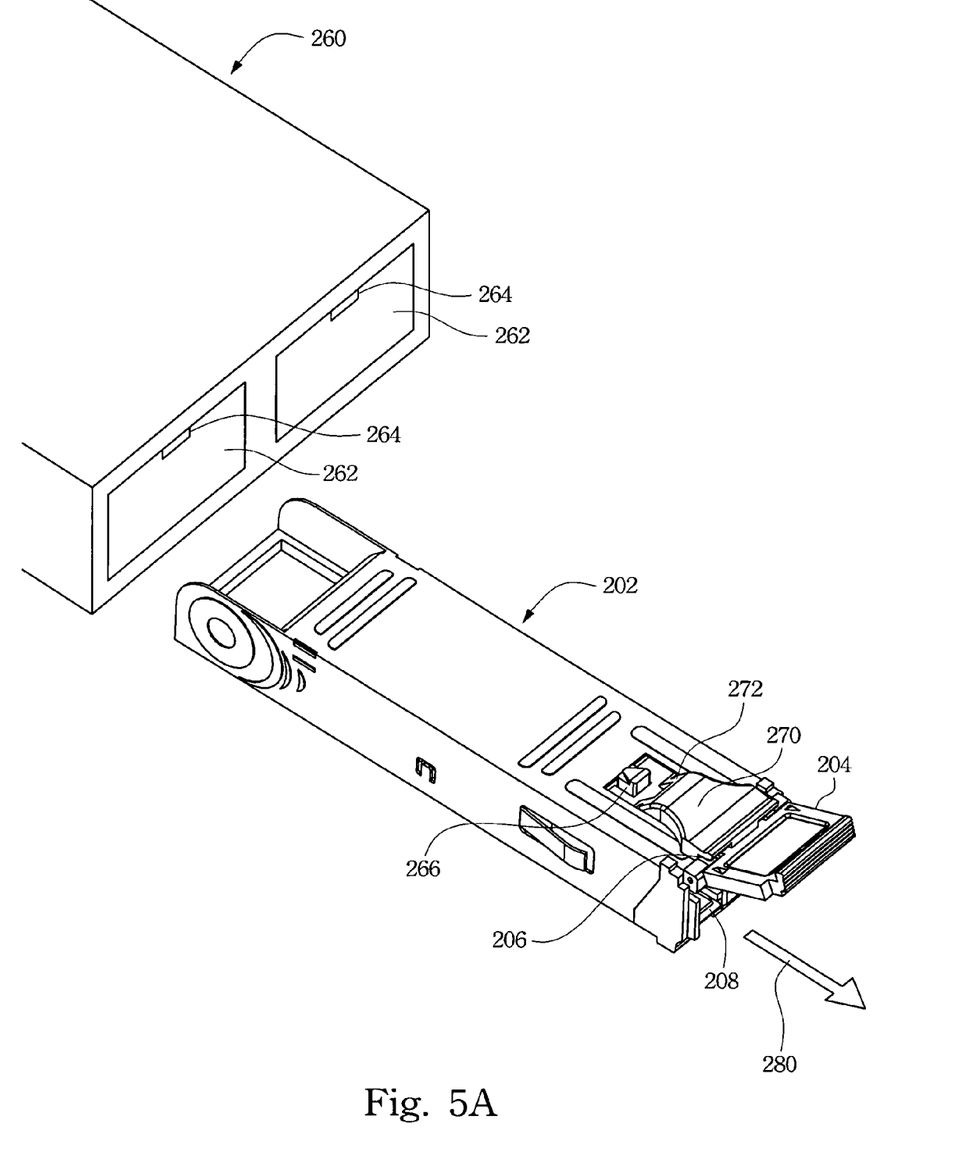
FIG. 5A is a schematic diagram of a transceiver in accordance with another preferred embodiment of the present invention.

FIG. 5A is a schematic diagram of a transceiver in accordance with another preferred embodiment of the present invention, wherein the transceiver is pluggable into a stack and includes a transceiver body 202, a first cover 204 and a first rebounding member 206.

The transceiver body 202 further includes a tenon 266. A stack 260 such as a switch stack has a plurality of ports 262 for accommodating the transceivers, and each of the ports 262 has an obstructive member 264 such as a flat spring. When the transceiver is plugged into the port 262 of the stack 260, the obstructive member 264 retains and prevents the transceiver from leaving the stack 260 by blocking the tenon 266.

Figure 5B:
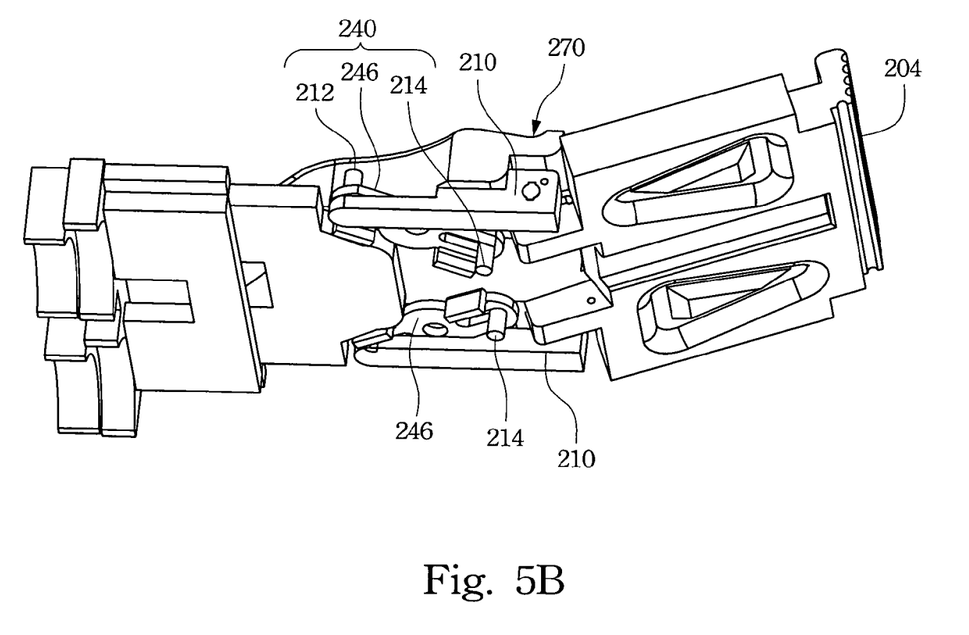
FIG. 5B is a schematic diagram of a reversing mechanism in accordance with another preferred embodiment of the present invention.

Reference is also made to FIG. 5B, which is a schematic diagram of a reversing mechanism in accordance with another preferred embodiment of the present invention. The transceiver further includes a direction-changing mechanism and a pushing block 270, and the transceiver body 202 further includes a driving member 210 for moving on the transceiver body 202. In the embodiment, the direction-changing mechanism is a reversing mechanism 240, coupled to both the driving member 210 and the pushing block 270. The first cover 204 is pivotally connected to the driving member 210 and the pushing block 270 with a pushing incline 272 is restricted to move along a direction.

When the first cover 204 is pulled along a first direction 280, the driving member 210 moves simultaneously along with the first cover 204 along the same direction and drives the pushing block 270 to move along an opposite direction through the reversing mechanism 240 to exclude the obstruction by the obstructive member 264. In the embodiment, the first direction 280 refers to a direction normal to a surface of a first opening 208.

Figure 6:
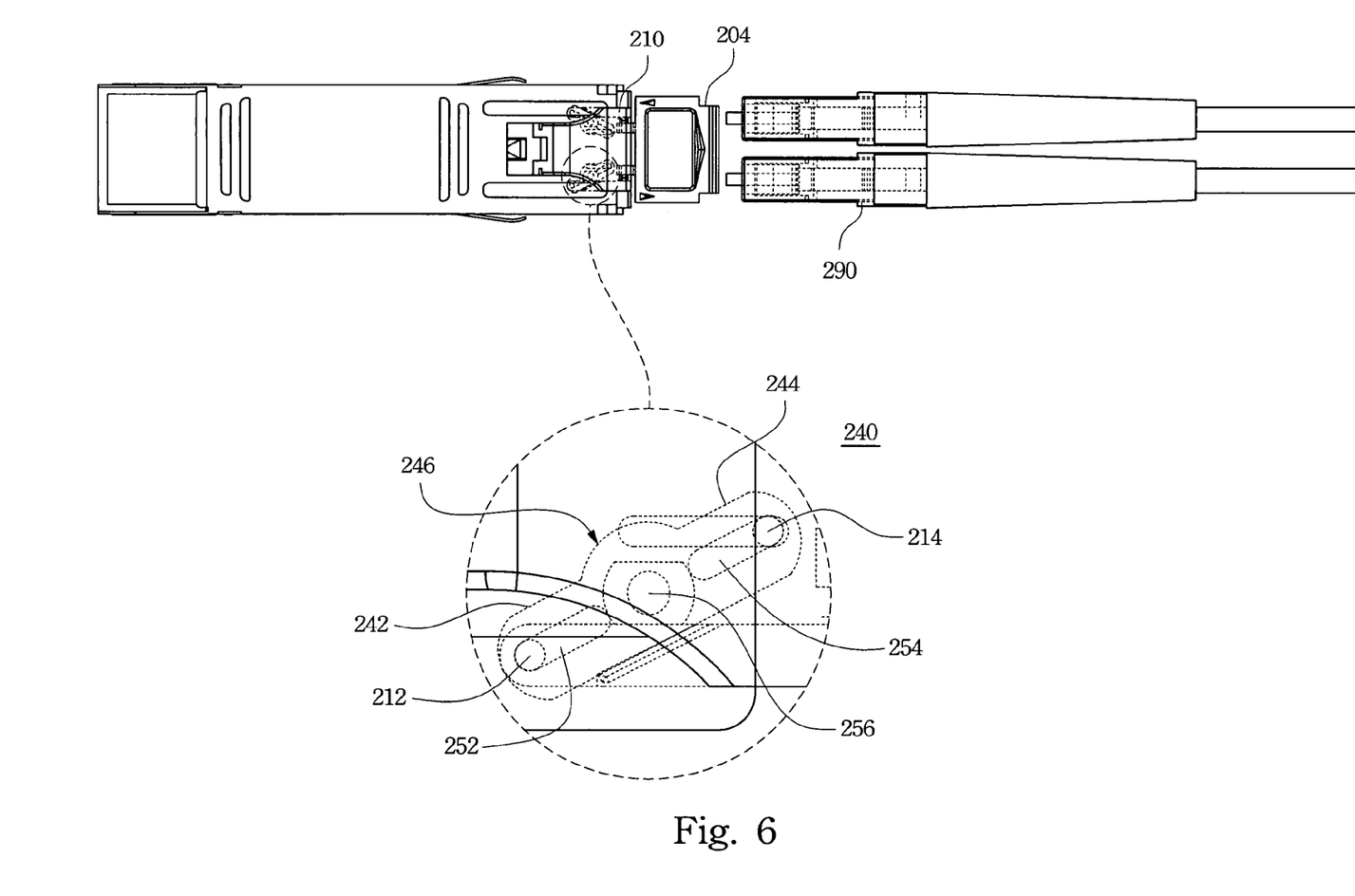
FIG. 6 is a schematic diagram of components of a transceiver when a removal function is not started in accordance with another preferred embodiment of the present invention.

FIG. 6 is a schematic diagram of components of a transceiver when a removal function is not started in accordance with another preferred embodiment of the present invention, and the reversing mechanism 240 is shown in detail. In the embodiment, the reversing mechanism 240 includes a rotatory lever 246, a first bump 212 for pushing or pulling the rotatory lever 246, and a second bump 214 for driving the pushing block 270.

The rotatory lever 246 pivoted at the rotating center 256 on the transceiver body 202 includes a first arm 242 and a second arm 244, and each of the arms has a sliding slot on it. The first bump 212 is connected to or even fixed on the driving member 210 and is restricted to slide in the first sliding slot 252, and the second bump 214 is either connected to or fixed on the pushing block 270 and is restricted to slide in the second sliding slot 254.

Alternatively, the second bump 214 may be fixed on the second arm 244 while the second sliding slot 254 is disposed on the pushing block 270, which can achieve the same result for sliding.

The first cover 204 is only needed to be rotated for the optical fiber connector 290 to be plugged into the first opening 208. When the optical fiber connector 290 is removed, the first cover 204 returns back automatically through the first rebounding member 206 to achieve a dustproof function.

Figure 7:
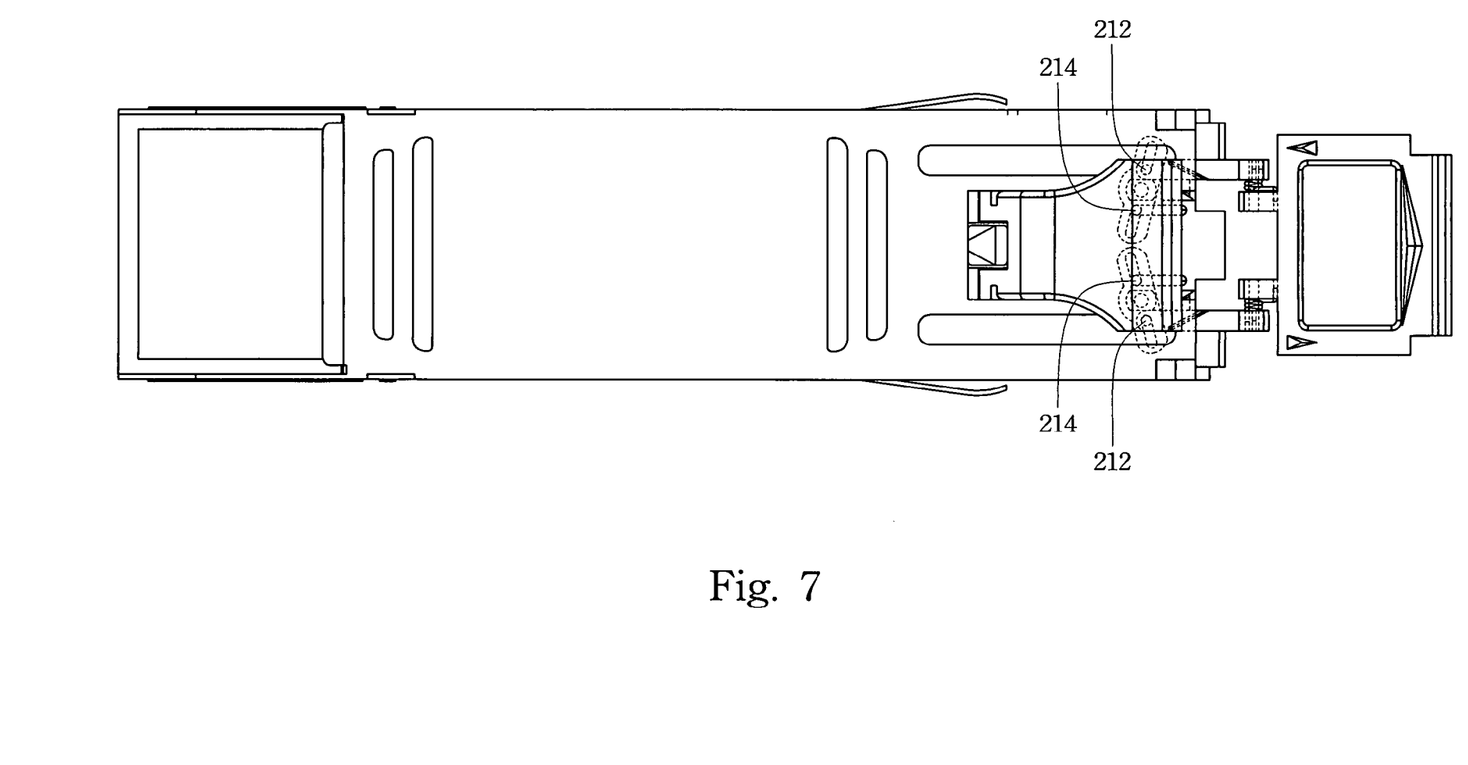
FIG. 7 is a schematic diagram of components of a transceiver when a removal function is started in accordance with another preferred embodiment of the present invention.

Reference is also made to FIG. 7, which is a schematic diagram of components of a transceiver when a removal function is started in accordance with another preferred embodiment of the present invention. The figure shows that the first bump 212 and the second bump 214 slide respectively in the first sliding slot 252 and the second sliding slot 254 during the operation of the reversing mechanism 240, and the pushing block 270 is driven to move as well.

The transceiver can be removed from the stack 260 when the optical fiber connector 290 is still in the first opening 208, that is, without removing the optical fiber connector 290. When the first cover 204 is pulled along the first direction 280, the driving member 210 follows and the first bump 212 on the driving member 210 slides in the first sliding slot 252 and drives the rotatory lever to rotate. Due to the rotation of the rotatory lever, the second bump 214 is forced to slide in the second sliding slot 254 of the second arm 254, and consequently the pushing block 270 is driven to move along a direction opposite to the first direction 280 by the second bump 214.

After the pushing incline 272 of the pushing block 270 contacts and presses against the obstructive member 264 so that the obstructive member 264 bends and deviates from obstructing the tenon 266, the transceiver can be pulled out of the port 262 to achieve removal of the transceiver even with the optical fiber connector 290 still in the first opening 208.

Figure 8:
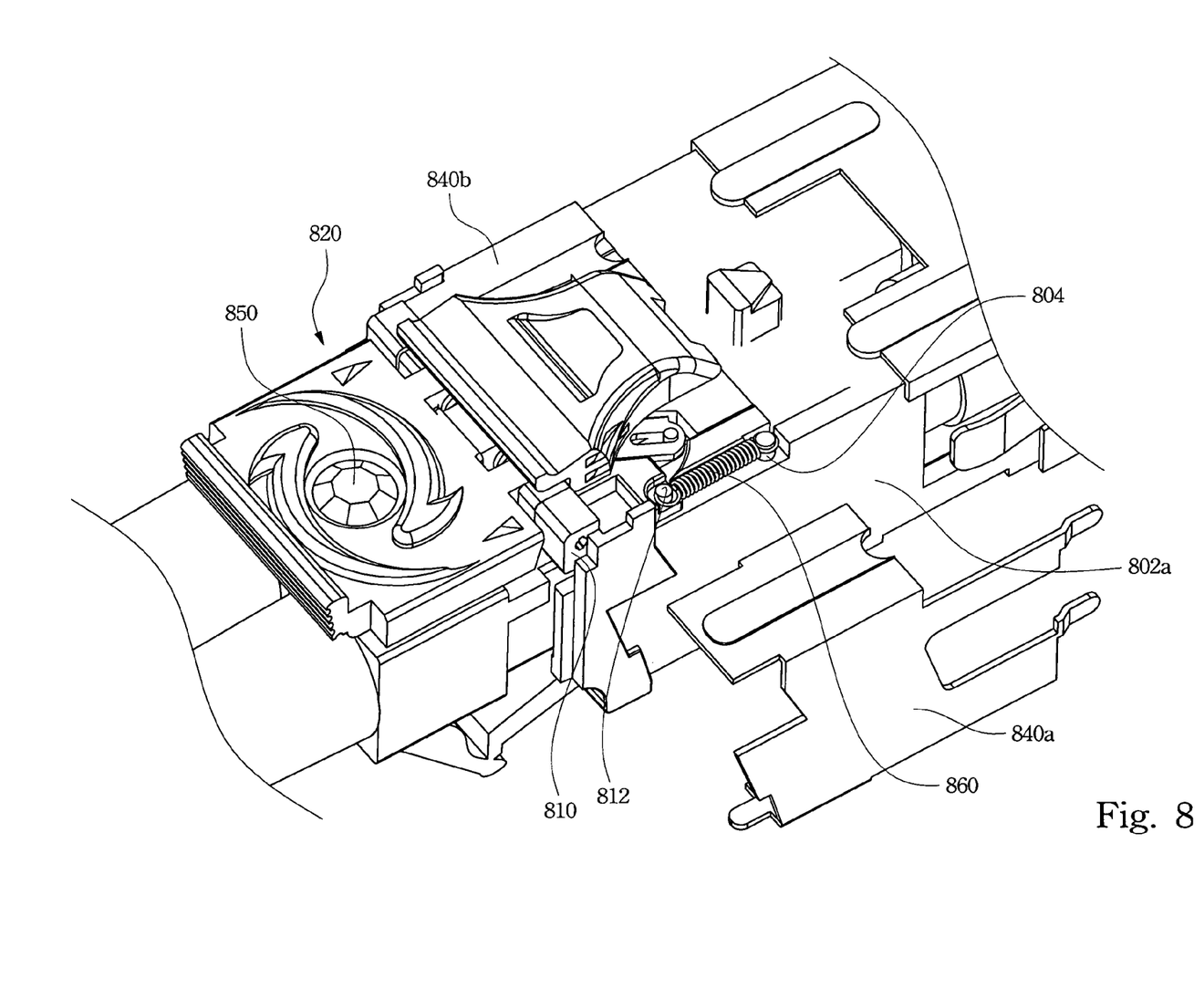
FIG. 8 is a schematic diagram of a transceiver in accordance with another preferred embodiment of the present invention.

Reference is now made to FIG. 8, which is a schematic diagram of a transceiver in accordance with another preferred embodiment of the present invention. In contrast with the embodiment in the FIG. 5A, the transceiver further includes an elastic device 860 such as a tensile spring, which is fixed on the transceiver body with one end and connected to the driving member 810 with another end for providing a returning force to keep the driving member 810 so that actuation of the removal function is prevented. In the embodiment, the ends of the tensile spring are respectively connected with detaining parts 804 and 812 of the driving member 810 and the transceiver body.

In operation of removal of the transceiver, a first cover 820 is pulled to move a driving member 810. After the removal of the transceiver, the pulling force acted on the first cover 820 is removed and then the driving member 810 is forced to return back to a position where the removal function is not started by the elastic device 860. Thus the components related to the removal of the transceiver are returned automatically through the elastic device 860 rather than manually.

Moreover, the elastic device also promotes the automatic dustproof function by the first cover because a gap between the first cover and the transceiver body may be formed for users failing to return the removal mechanism manually.

The transceiver further includes a shelter 840a and an identifying body. The shelter 840a covers a portion of a sidewall 802a of the transceiver body and the components related to removal function of the transceiver such as the elastic device 860, the driving member 810 and a reversing mechanism. The shelter 840a is adapted for protecting and preventing the removal function-related components spreading out. The figure shows that the shelter 840a is not assembled in place and the shelter 840b is installed on the transceiver body covering the removal function-related components.

The identifying body 850, may be a colorful object, is attached to or embedded in the first cover 820 such as on the outer surface for identification of products.

The present invention has the following advantage. The dustproof and pluggable transceiver initiates a dustproof function automatically and further holds the cover through a flat spring for more steadiness in use.

With a reversing mechanism and a pushing block, the transceiver integrates both a dustproof function and a plug/unplug function without needing to remove the optical fiber connector. Conventionally, the transceiver is removed by a handle after removal of the optical fiber connector that interferes with the operation of the handle if not removed. The present invention provides a removal function of the transceiver from the stack without removing the optical fiber connector in advance, so that contamination of the optic fiber and the transceiver, as well as wear resulting from plugging and unplugging, is reduced. Therefore, the invention is a great step forward in the art for its unique removal function.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A dustproof transceiver, comprising:
a transceiver body having a first opening;
a first cover pivoted on the transceiver body;
a first rebounding member having a first end coupled with the transceiver body and a second end coupled with the first cover for exerting a force on the first cover to return to shelter the first opening;
a driving member movable on the transceiver body and pivoted on the first cover;
a reversing mechanism coupled with the driving member; and
a pushing block coupled with the reversing mechanism and having a pushing incline,
wherein when the first cover moves along a first direction, the driving member moves along with the first cover and drives the pushing block to move opposite to the first direction through the reversing mechanism to push away an obstructive member of a stack.

2. The dustproof transceiver of claim 1, wherein the first cover further comprises a first protrusion protruding from a surface of the first cover.

3. The dustproof transceiver of claim 2, wherein the first cover further comprises a second protrusion separated from the first protrusion at a predetermined distance.

4. The dustproof transceiver of claim 1, further comprising a second cover moving restrainedly in a bottom sliding slot of the transceiver body, and a second rebounding member coupled with the second cover and the transceiver body for forcing and returning the second cover to shelter a second opening of the transceiver body.

5. The dustproof transceiver of claim 1, wherein the reversing mechanism comprises:
a rotatory lever pivoted on the transceiver body and having a first arm and a second arm, wherein the first arm has a first sliding slot and the second arm has a second sliding slot;
a first bump fixed on the driving member and restricted to move in the first sliding slot;
a second bump fixed on the pushing block and restricted to move in the second sliding slot;
wherein when the driving member moves, the first bump drives the rotatory lever to rotate so that the second arm drives the pushing block to move by the second bump.

6. The dustproof transceiver of claim 1, further comprising a fiat spring fixed on the transceiver body for holding the first cover.

7. A dustproof and pluggable transceiver for a stack, comprising:
a transceiver body having a first opening;
a first cover pivoted on the transceiver body;
a first rebounding member having a first end coupled with the transceiver body and a second end coupled with the first cover for exerting a force on the first cover to return to shelter the first opening;
a driving member movable on the transceiver body and pivoted on the first cover;
a direction-changing mechanism coupled with the driving member; and
a pushing block coupled with the direction-changing mechanism and having a pushing incline,
wherein when the first cover moves along a first direction, the driving member moves along with the first cover and drives the pushing block to move opposite to the first direction through the direction-changing mechanism to push away an obstructive member of a stack.

8. The dustproof transceiver of claim 7, wherein the first cover further comprises a first protrusion protruding from a surface of the first cover.

9. The dustproof transceiver of claim 7, wherein the first cover further comprises a second protrusion separated from the first protrusion at a predetermined distance.

10. The dustproof transceiver of claim 7, wherein the first rebounding member is a torsion spring.

11. The dustproof transceiver of claim 7, further comprising a second cover moving restrainedly in a bottom sliding slot of the transceiver body, and a second rebounding member coupled with the second cover and the transceiver body for returning the second cover to shelter a second opening of the transceiver body.

12. The dustproof transceiver of claim 7, wherein the direction-changing mechanism comprises:
a rotatory lever pivoted on the transceiver body and having a first arm and a second arm, wherein the first arm has a first sliding slot and the second arm has a second sliding slot;
a first bump connected to the driving member and restricted to move in the first sliding slot; and
a second bump connected to the pushing block and restricted to move in the second sliding slot,
wherein when the driving member moves, the first bump drives the rotatory lever to rotate so that the second arm drives the pushing block to move by the second bump.

13. The dustproof transceiver of claim 7, further comprising an elastic device connected to the transceiver body and the driving member with both ends for providing a returning force for the driving member.

14. The dustproof transceiver of claim 13, further comprising a shelter covering a portion of a sidewall of the transceiver, the elastic device, the driving member and the reversing mechanism for a protection and a prevention of spreading out.

15. The dustproof transceiver of claim 7, further comprising an identifying body disposed on an outer surface of the first cover for an identification.

* * * * *